United States Patent
Goebel et al.

(10) Patent No.: US 8,367,270 B2
(45) Date of Patent: Feb. 5, 2013

(54) FLOW FIELD PLATE ARRANGEMENT FOR A FUEL CELL

(75) Inventors: Steven G. Goebel, Victor, NY (US);
Daniel Miller, Victor, NY (US);
Matthew J. Beutel, Webster, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 776 days.

(21) Appl. No.: 12/201,443

(22) Filed: Aug. 29, 2008

(65) Prior Publication Data

US 2008/0311459 A1 Dec. 18, 2008

Related U.S. Application Data

(62) Division of application No. 10/669,479, filed on Sep. 24, 2003, now Pat. No. 7,462,415.

(51) Int. Cl.
*H01M 8/04* (2006.01)
*H01M 8/24* (2006.01)
*H01M 2/38* (2006.01)
*H01M 2/40* (2006.01)

(52) U.S. Cl. .................................. 429/514; 429/457
(58) Field of Classification Search .................. 429/514, 429/457
See application file for complete search history.

(56) References Cited

U.S. PATENT DOCUMENTS

| | | |
|---|---|---|
| 4,037,023 A | 7/1977 | Grehier et al. |
| 5,108,849 A | 4/1992 | Watkins et al. |
| 5,300,370 A | 4/1994 | Washington et al. |
| 5,773,160 A | 6/1998 | Wilkinson et al. |
| 5,981,098 A | 11/1999 | Vitale |
| 6,007,933 A | 12/1999 | Jones |
| 6,015,633 A | 1/2000 | Carlstrom, Jr. et al. |
| 6,245,453 B1 | 6/2001 | Iwase et al. |
| 6,454,978 B1 | 9/2002 | Thielman |
| 6,544,681 B2 | 4/2003 | McLean et al. |
| 6,555,261 B1 | 4/2003 | Lewinski et al. |
| 6,974,648 B2 | 12/2005 | Goebel |
| 2001/0041281 A1 | 11/2001 | Wilkinson et al. |
| 2002/0004158 A1 | 1/2002 | Suzuki et al. |
| 2002/0064702 A1 * | 5/2002 | Gibb ............................ 429/34 |
| 2002/0081477 A1 * | 6/2002 | McLean et al. ............... 429/34 |
| 2003/0224239 A1 | 12/2003 | Carlstrom |

FOREIGN PATENT DOCUMENTS

| | | |
|---|---|---|
| JP | 57-136777 | 8/1982 |
| JP | 62-26865 | 2/1987 |
| JP | 05-094831 | 4/1993 |
| JP | 2000-012050 A | 1/2000 |
| WO | 02/37592 A1 | 5/2002 |

OTHER PUBLICATIONS

W.R. Merida, et al., "Novel PEM Fuel Cell Design With Non-Planar Membrane-Electrode Assemblies", Institute for Integrated Energy Systems, University of Victoria, Canada, pp. 1-9.
Japanese Office Action dated Oct. 26, 2009 pertaining to Japanese application No. 2006-527979.

* cited by examiner

*Primary Examiner* — Ula C Ruddock
*Assistant Examiner* — Lisa S Park Gehrke
(74) *Attorney, Agent, or Firm* — Dinsmore & Shohl LLP

(57) ABSTRACT

A fuel cell comprising anode and cathode flow field plates having a multitude of flow channels separated by land features wherein the land features of the anode side are wider than the land features of the cathode side is disclosed. In fuel cells, the flow field plate arrangement of the present invention provides higher power (lower cost per kW), improved durability, and less stringent assembly alignment.

10 Claims, 8 Drawing Sheets

FLOW FIELD PLATE ARRANGEMENT FOR A FUEL CELL

CROSS-REFERENCE TO RELATED APPLICATIONS

This application is a division of U.S. patent application Ser. No. 10/669,479 now U.S. Pat. No. 7,462,415, filed Sep. 24, 2003.

BACKGROUND OF THE INVENTION

This invention relates generally to the field of electrochemical cells, and in particular to flow field plate arrangements for membrane electrode assemblies in fuel cells.

Fuel cells are electrochemical devices which directly combine hydrogen from a fuel and oxygen, usually from the air, to produce electricity and water. With prior processing, a wide range of fuels, including hydrogen, natural gas, methanol, gasoline and coal-derived synthetic fuels, can be converted to electric power. Fuel cells may be used as stationary electric power plants in buildings and residences, as vehicle power sources in cars, buses and trucks and as portable power in video cameras, computers and the like. The basic process is highly efficient (40-75%), pollution-free, quiet, free from moving parts (other than an air compressor, cooling fans, pumps and actuators) and may be constructed to leave only heat and water as by-products. Since single fuel cells can be assembled into stacks of varying sizes, systems can be designed to produce a wide range of energy output levels and thus satisfy numerous kinds of applications.

There are several different types of fuel cells under such labels as phosphoric acid, alkaline, molten carbonate, solid oxide and proton exchange membrane (PEM). The basic components of a PEM fuel cell are the two electrodes separated by a polymer membrane electrolyte. Each electrode is coated on one side with a thin catalyst layer. The electrodes, catalyst and membrane together form a membrane electrode assembly (MEA). In a typical PEM-type fuel cell, the MEA is sandwiched between "anode" and "cathode" diffusion mediums (hereinafter "DMs") that can be formed from a resilient and conductive material such as carbon fabric or paper. The anode and cathode DMs serve as porous electrical conductors between catalyzed sites of the PEM and the fuel (e.g., hydrogen) and oxidant (e.g., air/oxygen) which flow in respective "anode" and "cathode" flow field plates.

Channels formed in the flow field plates supply hydrogen and air to the electrodes on either side of the PEM. In particular, hydrogen flows through the channels to the anode where the catalyst promotes separation into protons and electrons. On the opposite side of the PEM, air flows through the channels to the cathode where oxygen in the air attracts the hydrogen protons through the PEM. Electrons are captured as useful electricity through an external circuit and are combined with the protons and oxygen to produce water vapor at the cathode side.

The channels forming the flow field plates have a cross sectional width and a land separating adjacent channels. The pitch of a flow field plate is the cross sectional width of the channel plus the cross sectional width of an adjacent land. Prior to the present invention, all flow field plates have utilized the same pitch on both the anode and cathode sides. As such, it has been necessary to provide land-to-land alignment across the MEA so that the compression loads can reduce the electrical contact resistance. Further, it has been desirable with such prior art flow field plates to provide as much land-to-land contact as possible so that the compression stress (force per unit contact area) is reduced to avoid localized damage to the diffusion media (DM) and MEA. However, to achieve good cell performance, it is desirable to have narrow lands to provide a minimum diffusion distance. However, narrow lands require precise land-to-land alignment which can be difficult to achieve due to manufacturing and assembly tolerances.

Accordingly, the present inventors have recognized a need to improve the design of the fluid flow plates of the fuel cells in order to increase cell performance.

SUMMARY OF THE INVENTION

The present invention provides in one embodiment an improved fluid flow plate arrangement comprising a first fluid flow plate comprising a plurality of first channels separated by first lands, and a second fluid flow plate comprising a plurality of second channels separated by second lands. At least one of the second lands has a cross sectional width wider than a cross sectional width of at least one of the first lands.

In another embodiment, the invention provides a device comprising an electrochemical cell. The electrochemical cell comprises a membrane electrode assembly defining an anode side of the cell and a cathode side of the cell, and a first flow field plate for the cathode side of the cell. The first flow field plate comprises a plurality of first channels separated by first lands. The electrochemical cell further comprises a second flow field for the anode side of the cell. The second flow field plate comprises a plurality of second channels separated by second lands, wherein the membrane electrode assembly is interposed between the first and second flow field plates, and a pitch defined by the first flow field plate is less than a pitch defined by the second flow field plate.

In still another embodiment, the invention provides a device comprising an electrochemical cell, the electrochemical cell comprises a membrane electrode assembly defining an anode side of the cell and a cathode side of the cell, and a first flow field plate for the cathode side of the cell. The first flow field plate comprises a plurality of first channels separated by first lands. The electrochemical cell further comprises a second flow field for the anode side of the cell. The second flow field plate comprises a plurality of second channels separated by second lands, wherein the membrane electrode assembly is interposed between the first and second flow field plates. The second channels define a cross sectional width approximately equal to a cross sectional width defined by the first channels. The second flow field plate defines a channel pitch substantially greater than a channel pitch defined by the first flow field plate, and at least the second lands are formed with a multiple of alternating angles relative to the first lands in a plane parallel to the second flow field plate. The respective channel pitches and cross-sectional widths ensure at least 30% land-to-land contact which is insensitive to plate-to-plate positioning.

Although the present invention is not limited to specific advantages or functionality, it is noted providing a flow field plate pair such as described in the above embodiments achieves high power (lower cost per kW), improved durability, and less stringent assembly alignment. The narrow land areas of the cathode flow field plate improve gas access to the active area under the lands and allow higher current density operation. The narrow channels of both the cathode and anode plates improve thermal conduction from the active area within each channel to the adjacent land areas. By utilizing wider land areas on the anode flow field plate where gas diffusion is not limiting and orienting the anode land areas at an angle to the cathode land areas, the requirement for critical alignment of adjacent flow field plates to provide sufficient land-on-land alignment across the membrane electrode assembly is alleviated.

These and other features and advantages of the invention will be more fully understood from the following description of preferred embodiments of the invention taken together with the accompanying drawings. It is noted that the scope of the claims is defined by the recitations therein and not by the specific discussion of features and advantages set forth in the present description.

BRIEF DESCRIPTION OF THE FIGURES

The following detailed description of the embodiments of the present invention can be best understood when read in conjunction with the following drawings, where like structure is indicated with like reference numerals and in which.

Skilled artisans appreciate that elements in the figures are illustrated for simplicity and clarity and have not necessarily been drawn to scale. For example, the dimensions of some of the elements in the figures may be exaggerated relative to other elements to help to improve understanding of embodiment(s) of the present invention.

DETAILED DESCRIPTION OF THE EMBODIMENTS OF THE INVENTION

An example of a fuel cell assembly incorporating and using the novel features of the present invention is depicted in FIGS. 1-8 and described in detail herein.

As used herein, "predominately straight" means substantial parallel channels that run from inlet to outlet in a non-serpentine pattern. As used herein, "diffusion medium" means a layer in an electrochemical cell adjacent to the active catalytic sites which allows transport of reactant and product mass and electric current to and from the active sites, which is preferably a porous electrically conductive material. As used herein, "flow field plate" refers to a component of an electrochemical cell allowing ingress and egress of fluids such as reactant and waste gasses and liquids to and from reaction zones.

Figure 1:
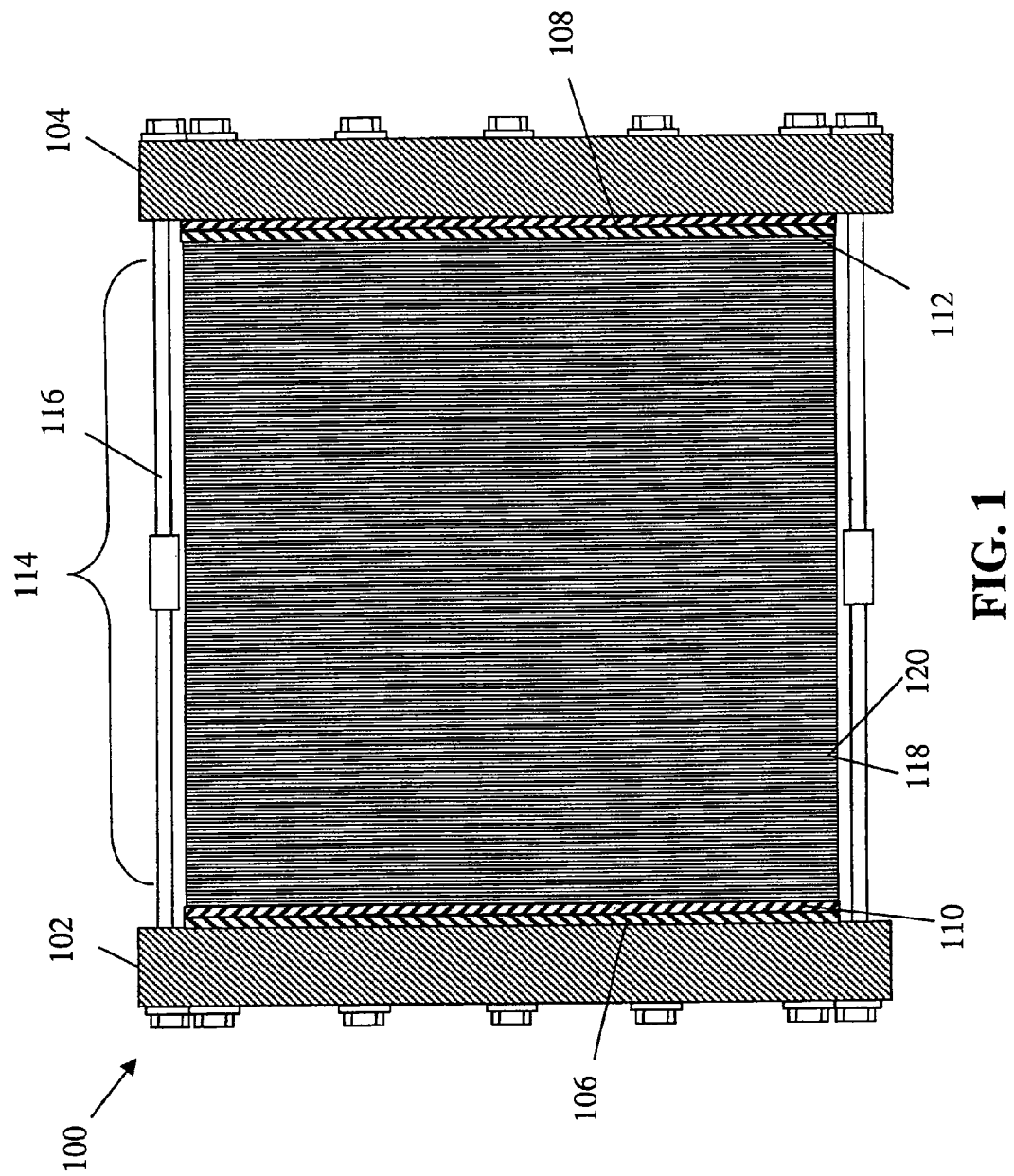
FIG. 1 is a sectional, side view of an embodiment of a fuel cell assembly incorporating and using flow field plates in accordance with the principles of the present invention.

In a first exemplary embodiment shown by FIG. 1, a fuel cell assembly 100 includes end plates 102 and 104, insulation layers 106 and 108, and current collector/conductor plates 110 and 112, with a working section 114 therebetween. The working section 114 includes one or more active sections and can include a selected number of cooling sections, as will be understood by those skilled in the art. In one aspect, the one or more active sections can further serve to perform cooling for the fuel cell assembly. A number of structural members 116, such as tie-bolt(s), can be employed to join the end plates.

Figure 4:
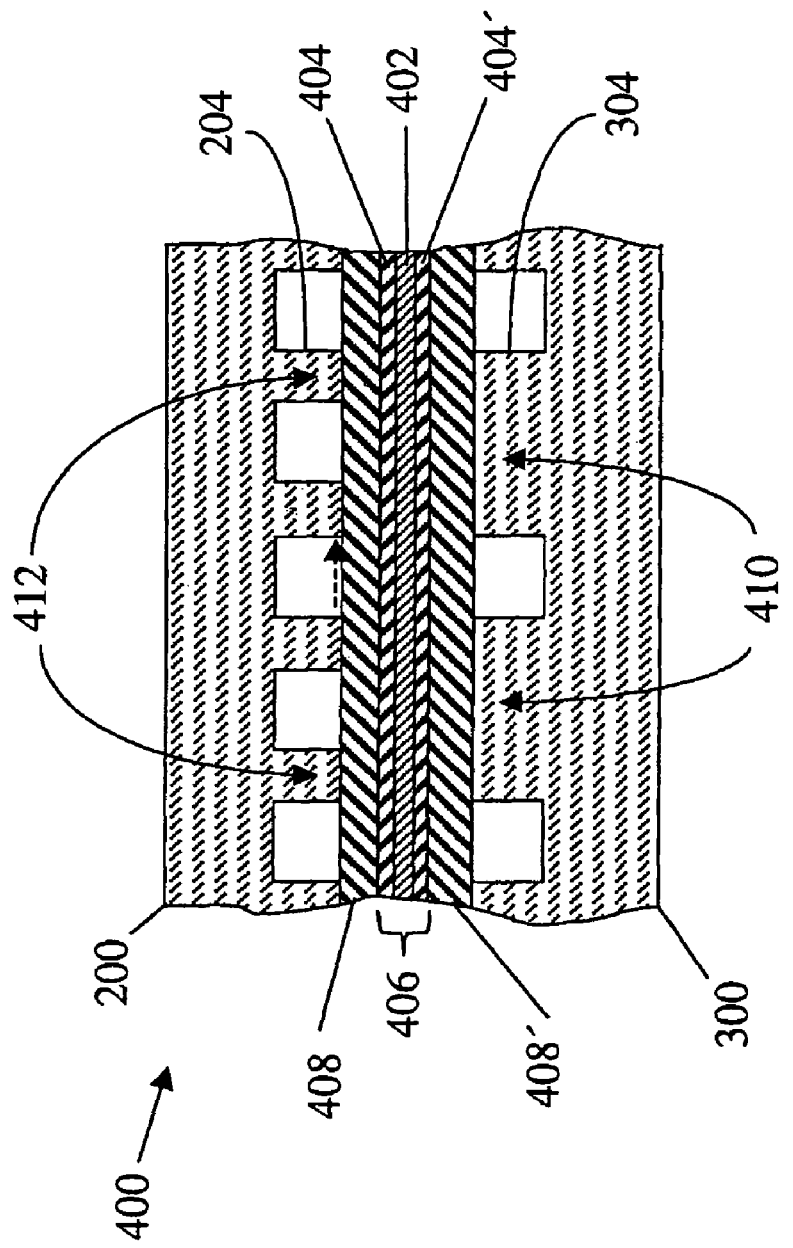
FIG. 4 is a sectional, partial, side representation of an embodiment of fluid flow plates serving as flow field plates in a fuel cell of the fuel cell assembly of FIG. 1 in accordance with the principles of the present invention.

Working section 114 includes a number of layer pairs 118 and 120. In one embodiment, a plurality of layer pairs 118 and 120 are components of one or more PEM-type fuel cells 400 (FIG. 4). The construction and utilization of PEM fuel cells is known in the art. By connecting an external load (not shown) between electrical contacts (not shown) of current collector/conductor plates 110 and 112, one can complete a circuit for use of current generated by the one or more PEM-type fuel cells.

Figure 2:
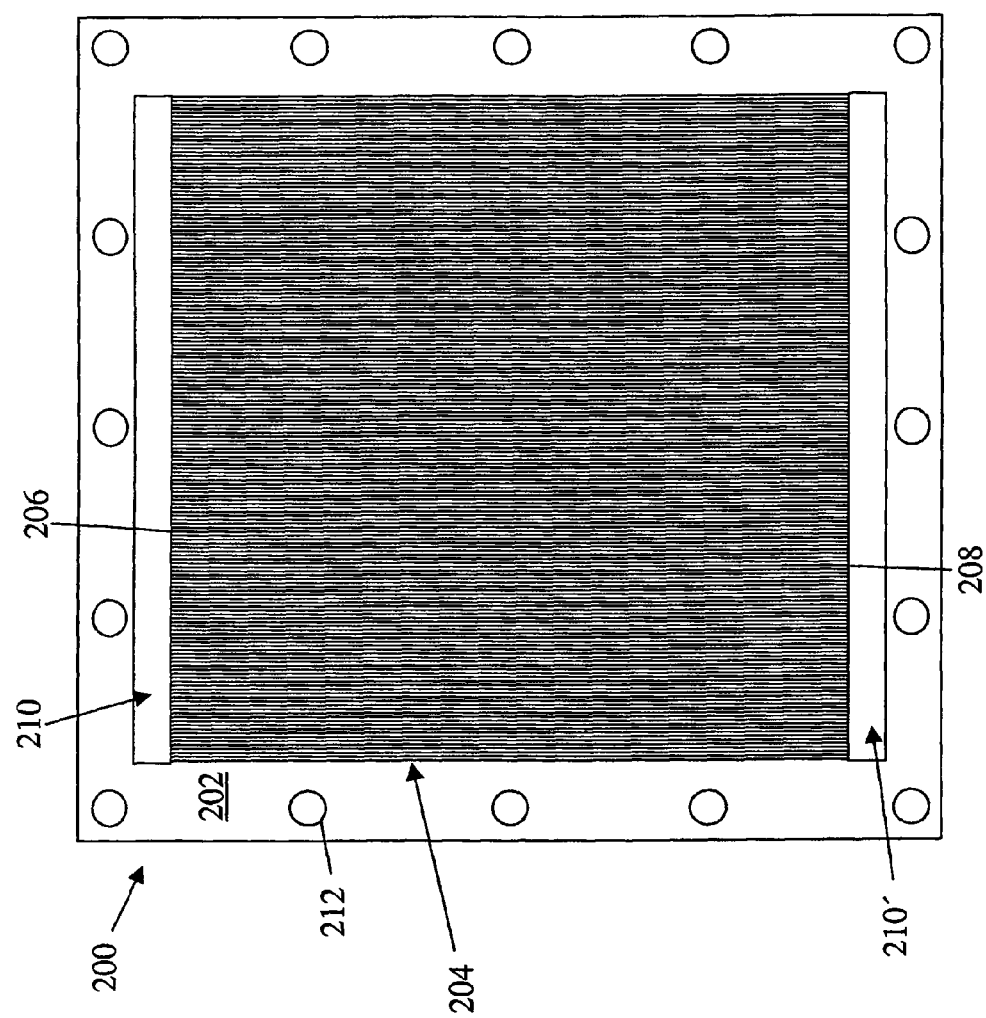
FIG. 2 is a plan view of an outer face representation of an embodiment of a cathode fluid flow plate of a fuel cell assembly in accordance with the principles of the present invention.

One example of the first layer 118 of working section 114 is depicted in FIG. 2 as first fluid flow plate 200. The plate 200 has a fluid flow face 202 with a plurality of substantially parallel flow channels 204 thereon. The flow channels 204 receive and transmit one or more fluids through ports 206 and 208, which are in fluid communication with corresponding fluid manifolds 210 and 210'. Corresponding layers of the first layer 118 generally form fluid manifolds 210 and 210' for supplying fluids to, removing fluids from, and otherwise communicating and/or servicing fluids as desired within the working section 114, as will be appreciated by those skilled in the art. For example, the flow channels can include respective inlet(s) 206 and outlet(s) 208 in fluid communication with corresponding entry and exit fluid manifolds 210 and 210'. Gasketing material or gaskets (not shown) can be employed to seal around peripheral holes 212, the flow face 202, and can cooperate with the longitudinal extents of layers 118 in formation of the fluid manifolds 210 and 210'.

Figure 3:
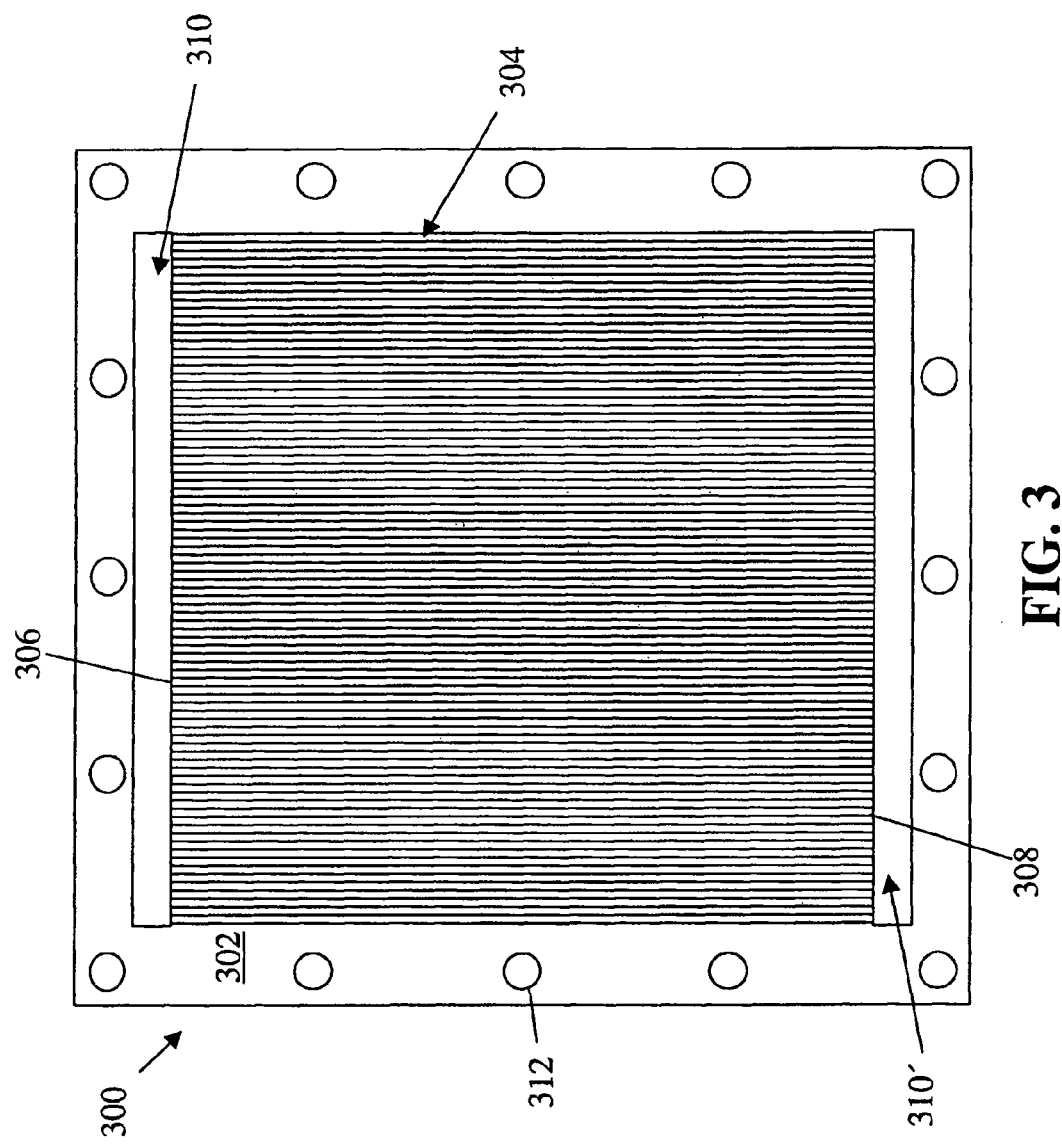
FIG. 3 is a plan view of an outer face representation of an embodiment of an anode fluid flow plate of a fuel cell assembly in accordance with the principles of the present invention.

One example of the second layer 120 of working section 114 is depicted in FIG. 3 as a fluid flow plate 300. The plate 300 has a fluid flow face 302 with a plurality of substantially parallel flow channels 304 thereon. The flow channels 304 receive and transmit one or more fluids through ports 306 and 308, which are in fluid communication with corresponding fluid manifolds 310 and 310'. Corresponding layers of the second layer 120 generally form fluid manifolds 310 and 310' for supplying fluids to, removing fluids from, and otherwise communicating and/or servicing fluids as desired within the working section 114, as will be appreciated by those skilled in the art. For example, the flow channels can include respective inlet(s) 306 and outlet(s) 308 in fluid communication with corresponding entry and exit fluid manifolds 310 and 310'. Gasketing material or gaskets (not shown) can be employed to seal around peripheral holes 312, the flow face 302, and can cooperate with the longitudinal extents of layers 120 in formation of the fluid manifolds 310 and 310'.

With reference to FIGS. 2 and 3, fluid flow plates 200 and 300 in one embodiment have a height of about 500 mm or less, and a width of about 500 mm or less. Further, the thickness of the fluid flow plates 200 and 300 is 1 mm or less. The fluid flow plates 200 and 300 are advantageously made of an electrically conductive material such as a metal. Alternately conductive carbon materials may be used. In addition, materials may be used which are plated, sputtered or otherwise coated with conductive layers by wet methods, vacuum methods, or any suitable method. Alternately, the fluid flow plates 200 and 300 of the present invention may be cut or otherwise formed into the diffusion medium layer of an MEA, so that a single layer of material serves as both DM and flow field.

Figure 6:
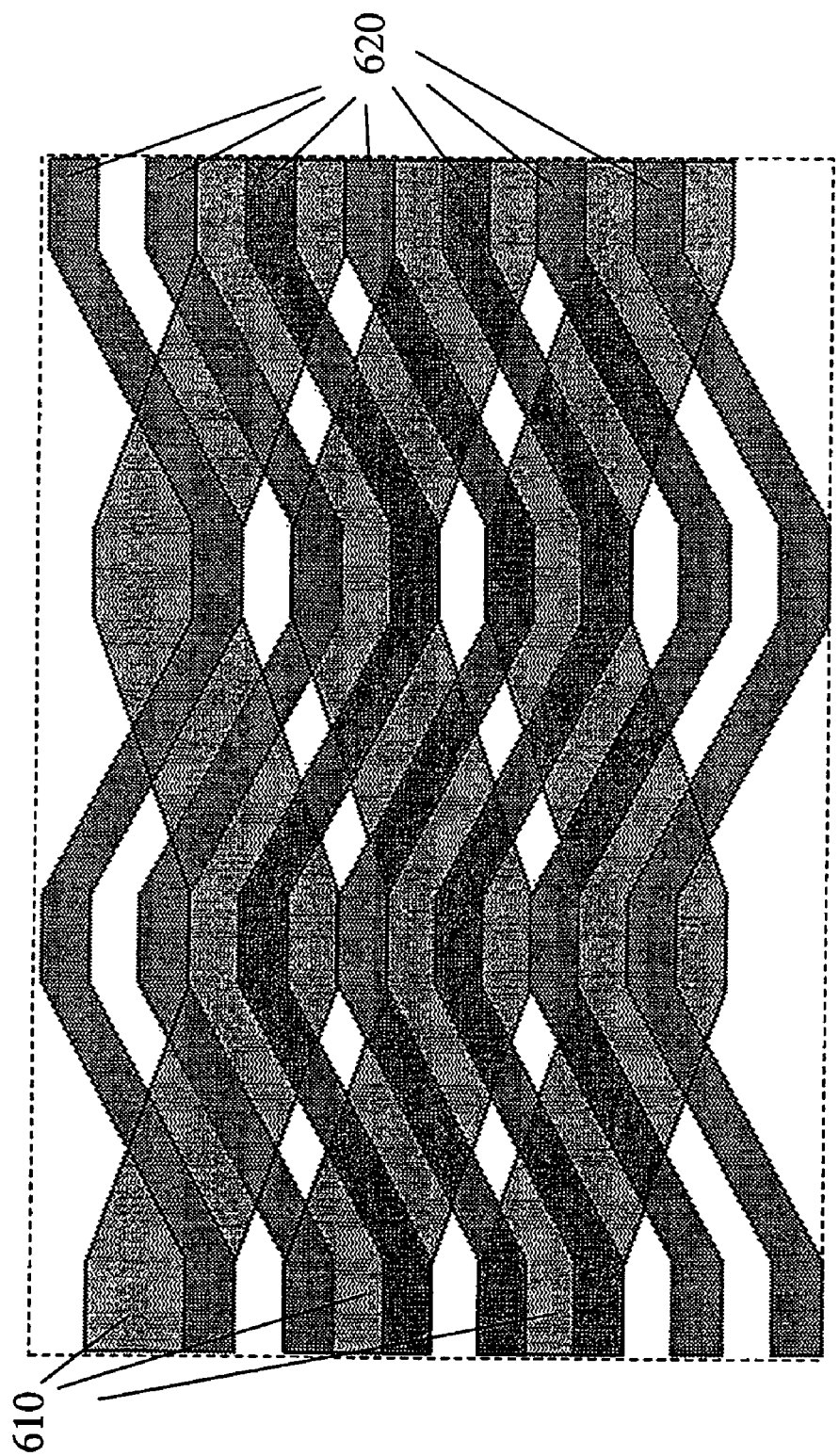
FIG. 6 is a sectional, partial, plan view of a land-to-land alignment representation illustrating another embodiment of fluid flow plates serving as flow field plates in a fuel cell of the fuel cell assembly of FIG. 1 in accordance with the principles of the present invention.

The flow channels 204 and 304 of each fluid flow plate 200 and 300, respectively, are depicted in one embodiment as flowing in a predominately straight line between fluid manifolds 122 and 122'. In another embodiment, the flow channels 204 and 304 may alternative in direction, in a wiggle fashion as depicted by FIG. 6. A more detailed discussion on the wiggle flow pattern is provided in a later section. Combined narrow lands and narrow channels lead to a fine pitch flow field (pitch being the sum of the land and channel widths). For stamped fluid flow plates, pitch is limited by the material stretch and the forming process. To remain within allowable forming limits, a fine pitch plate would require shallower channel depths which would increase the pressure drop. By using a straight channel configuration or wiggle channel configuration rather than a conventional serpentine pattern, the pressure drop requirements could still be met. However, it is to be appreciated that the concept of the present invention of having narrow cathode lands crossing wider anode lands may also be suitably applied to fluid flow plates having a serpentine pattern.

For molded composite fluid flow plates, finer pitches can be formed without the restriction on channel depth. However, to minimize repeat distance, it would also be desirable to also use straight flow paths to allow shallow channel depths and still meet pressure drop requirements. Note that the flow field channels may diverge and converge from and to the inlet and outlet headers, respectively, but would otherwise be straight channels within the majority of the flow field for minimum pressure drop. The flow field would then incorporate branching of channels from and to the inlet and outlet, respectively. Additionally, a wider active area could also be used to reduce pressure drop.

For purposes of illustration, FIG. 4 depicts a fuel cell 400 according to one embodiment of the present invention. Reference numerals which are the same as those used in FIGS. 2 and 3 represent the same components. In this embodiment, fluid flow plates 200 and 300 serve as flow field plates. In particular, flow field plate 200 serves as a cathode side of the fuel cell, and flow field plate 300 serves as an anode side of the fuel cell. That is, face 202 comprises a cathode face, and face 302 comprises an anode face. The flow channels 204 and 304 of flow field plates 200 and 300, respectively, conduct fluids which include reactant fluids for fuel cell assembly 100.

In one embodiment according to the present invention, flow channels 304 carry a fuel such as hydrogen and flow channels 204 carry an oxidant such as air/oxygen. The flow channels 204 and 304 also carry vapor and/or liquid (e.g., humidification and/or product water), as will be understood by those skilled in the art. In one embodiment, coolant is also provided to the opposite surface of each flow field plate 200 and 300 to minimize the temperature difference between lands and channels to improve membrane durability which is sensitive to temperature.

As shown, fuel cell 400 includes membrane or solid electrolyte 402. In one embodiment, solid electrolyte 402 comprises a solid polymer electrolyte made using a polymer such as a material manufactured by E.I. DuPont de Nemours Company and sold under the trademark NAFION®. Further, an active electrolyte such as sulfonic acid groups might be included in this polymer. In another embodiment, the solid polymer electrolyte 402 is formed with a product manufactured by W.L. Gore & Associates (Elkton, Md.) and sold under the trademark GORE-SELECT®. Moreover, catalysts 404 and 404' (e.g., platinum), which facilitate chemical reactions, are applied to the anode and cathode sides, respectively, of the solid polymer electrolyte. This unit can be referred to as a "membrane electrode assembly" (hereinafter "MEA") 406. In one embodiment, the MEA 406 is formed with a product manufactured by W. L. Gore & Associates and sold under the trade designation PRIMEA 5510-HS.

MEA 406 is sandwiched between cathode and anode diffusion mediums (hereinafter "DMs") 408 and 408', respectively, which are preferably formed with a resilient and conductive material such as carbon fabric, carbon fiber paper, carbon cloth or carbon paper. In one embodiment, DMs 408, 408' have a nominal thickness of 1 mm or less.

The cathode and anode DMs 408, 408' serve as porous electrical conductors between catalyzed sites of MEA 406 and the oxidant (e.g., air/oxygen) and fuel (e.g., hydrogen) which each flow in cathode and anode flow channels 204 and 304, respectively. The DMs 408, 408' also allow reactant gas molecules to pass generally longitudinally from the flow channels 204 and 304 to each respective surface of the MEA 406. Additionally, DM 408 allows product water formed at the cathode surface of the MEA 406 to be removed therefrom by flowing generally longitudinally into the cathode flow channels 204, to prevent flooding of the catalyst particles. Further, DM 408' allows water added to the fuel stream to pass generally longitudinally from flow channel 204' to humidify membrane 402.

As best shown by FIG. 4 for comparison between flow field plates 200 and 300, the cross-sectional dimension of width of each flow channel 204 on face 202 and each flow channel 304 on face 302 is 1.5 mm or less. Providing such narrow channels 204 and 304 improves thermal conduction, as the conduction path is shorter from the active area within each channel to adjacent lands. Additionally, the cross-sectional dimension of depth of each flow channel 204 and 304 is 1.0 mm or less. However, unlike prior art fluid flow plate pairs used to sandwich therebetween the MEA 402 and DMs 404, 404', the cross-sectional dimension of width of an anode land 410 separating adjacent flow channels 304 of the anode plate 300 is wider than the cross-sectional dimension of width of a cathode land 412 separating adjacent flow channels 204 of the cathode plate 200.

It has been observed by the inventors that in order to achieve good cell performance, it is desirable to have narrower lands on the cathode flow field plate 200 than on the anode flow field plate 300. As the cathode kinetics can be limited due to the depletion of oxygen in the air, it has been found that providing narrower lands on the cathode flow field plate 200 insures sufficient diffusion of oxygen to the MEA 406 in order to achieve a high current density. With the higher $H_2$ diffusivity, mass transport on the anode side of the MEA 406 is not a limiting factor, so wider lands can be used on the anode flow field plate 300 without a loss in performance of the fuel cell 400.

In one embodiment, each anode land 410 has a cross-sectional dimension of width about three times wider than the cross-sectional dimension of width of each cathode land 412. In one embodiment, the cross-sectional dimension of width of each cathode land 412 is 1 mm or less. In another embodiment, the pair of flow field plates 200 and 300 each have a pitch 2.5 mm or less. Additionally, it is to be appreciated that while the anode pitch can be larger than the cathode pitch, it is only illustrated this way for convenience.

To achieve desirable contact resistance (<30 mOhm-cm2) with reasonable land-on-land contact stress (<400 psi), 30% to 50% land-to-land alignment across the MEA 406 is suitable for many embodiments. For example, in one illustrative embodiment, lands 412 are provided such that they cover 40% of the cathode flow field 200 and lands 410 are provided such that they cover 75% of the anode flow field 300, which provides land-to-land alignment of 30% for crossed lands.

Furthermore, compression data has shown that for wide channels (e.g., greater than 1.5 mm) contact between the DMs 408 and 408' and MEA 406 is difficult to maintain in the center of the channels, which is needed for electrical and thermal conduction. It is also necessary to provide land-to-land alignment across the MEA 406 so that the compression loads can reduce the electrical contact resistance, and that the compression stress (force per unit contact area) is reduced to avoid localized damage to the DMs and MEA. With the anode lands 410 being significantly wider in cross section than the cathode lands 412, the difficulty of providing precise land-to-land alignment due to manufacturing and assembly tolerances in prior art flow field plates having the same pitch is alleviated.

In one embodiment, to maintain land-to-land alignment of the narrow lands 410 and 412 (e.g., widths of about 1.5 mm or less) such as for example as illustrated by FIG. 4, alignment features such as pins (not shown) between plates 200 and 300 may be provided. Note that it is undesirable to have a narrow land align with a channel (via a slight plate-to-plate misalignment) as the plates could "nest" in that region and cause the MEA 406 or DM 408 to tear. The above-mentioned issue is avoided by arranging the lands at an angle to each other so they cannot nest, embodiments of which are discussed hereafter.

Figure 5:
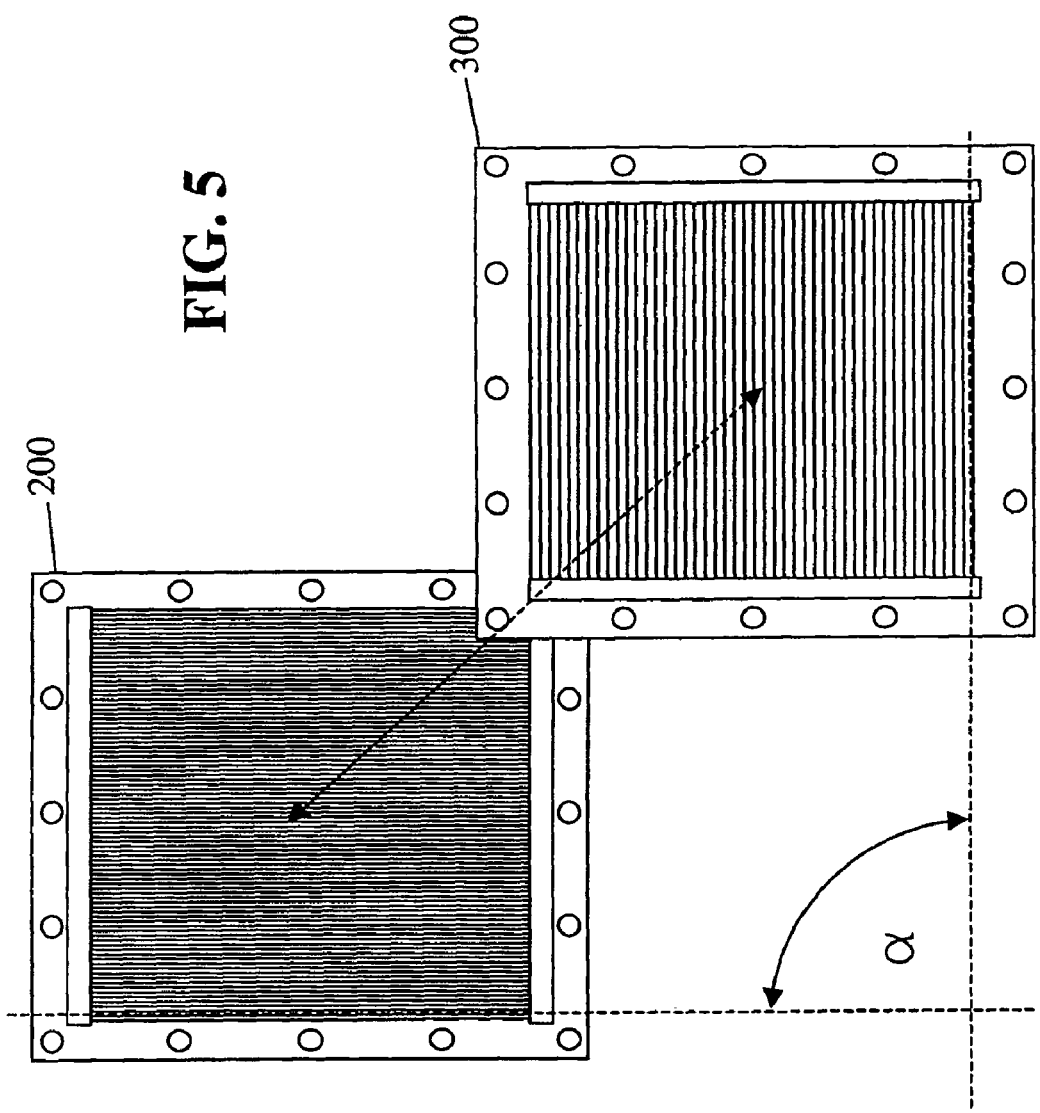
FIG. 5 is a plan view of the flow field plates of FIGS. 2 and 3, and representing an embodiment having an off axis orientation between the flow channels on flow field plate faces in a fuel cell of a fuel cell assembly in accordance with the principles of the present invention.

Referring to FIG. 5, an alternative embodiment providing suitable conductivity between MEA 406 and contact positions on faces 202 and 302 that avoid the nesting problem is shown. In this embodiment, the anode lands 410 are either formed and/or oriented at an angle α to the cathode lands 412 so that precise alignment is not required in order to provide adequate land-to-land alignment. As depicted by FIG. 5, the flow field plates 200 and 300 are arranged orthogonal to each other, however, it is to be appreciated that the lands 410 and 412 may be angled relative to each other from 0° to 90° and still achieve the benefits of the present invention.

With reference to FIG. 6 and in still another embodiment, the channels in one or both flow fields are formed with a multiple of alternating angles or "wiggles." It is to be appreciated that the alignment sensitivity can be assessed by counting the number of overlapping crests between the anode lands 610 and the cathode lands 620 and the change after the cathode lands are displaced as may occur during stack assembly. To ensure consistent land-on-land alignment in the crest regions of these wiggled lands and to avoid the nesting problem, the anode land width and wiggle amplitudes are selected as described below. These wiggles can be in or out of phase.

With flow plates having a wiggle alignment pattern, it is a desire that as one pair of crests becomes non-aligned land-to-land, another pair becomes aligned. This is achieved according by the following equation (1):

$$(Ac+Af)=N*p \pm Wc \text{ (for out of phase wiggles)} \quad (1)$$

where Ac is the amplitude of the coarse lands, Af is the amplitude of the narrow lands, N is an integer, p is the pitch, Wc is the land width of the coarse lands. Both solutions (±Wc) are satisfied when Wc=N/2*p. Note that unique solutions exist when Wc=N*p, in other words, when the land width equals a pitch, so the pattern is periodic on a single land.

For in phase wiggles, equation (2) provides:

$$(Ac-Af)=\pm N*p \pm Wc \quad (2)$$

where both solutions are satisfied when Wc=N/2*p. Alternatively, in another embodiment where alignment desensitization is achieved by pairs of crests, equation (3) may be used for out of phase wiggles and equation (4) may be used for in phase wiggles, which are as follows:

$$(Ac+Af)=N*p \pm 2*Wc \quad (3)$$

$$(Ac-Af)=\pm N*p \pm 2*Wc \quad (4)$$

where equations (3) and (4) are satisfied when Wc=N/4*p.

Figure 7:
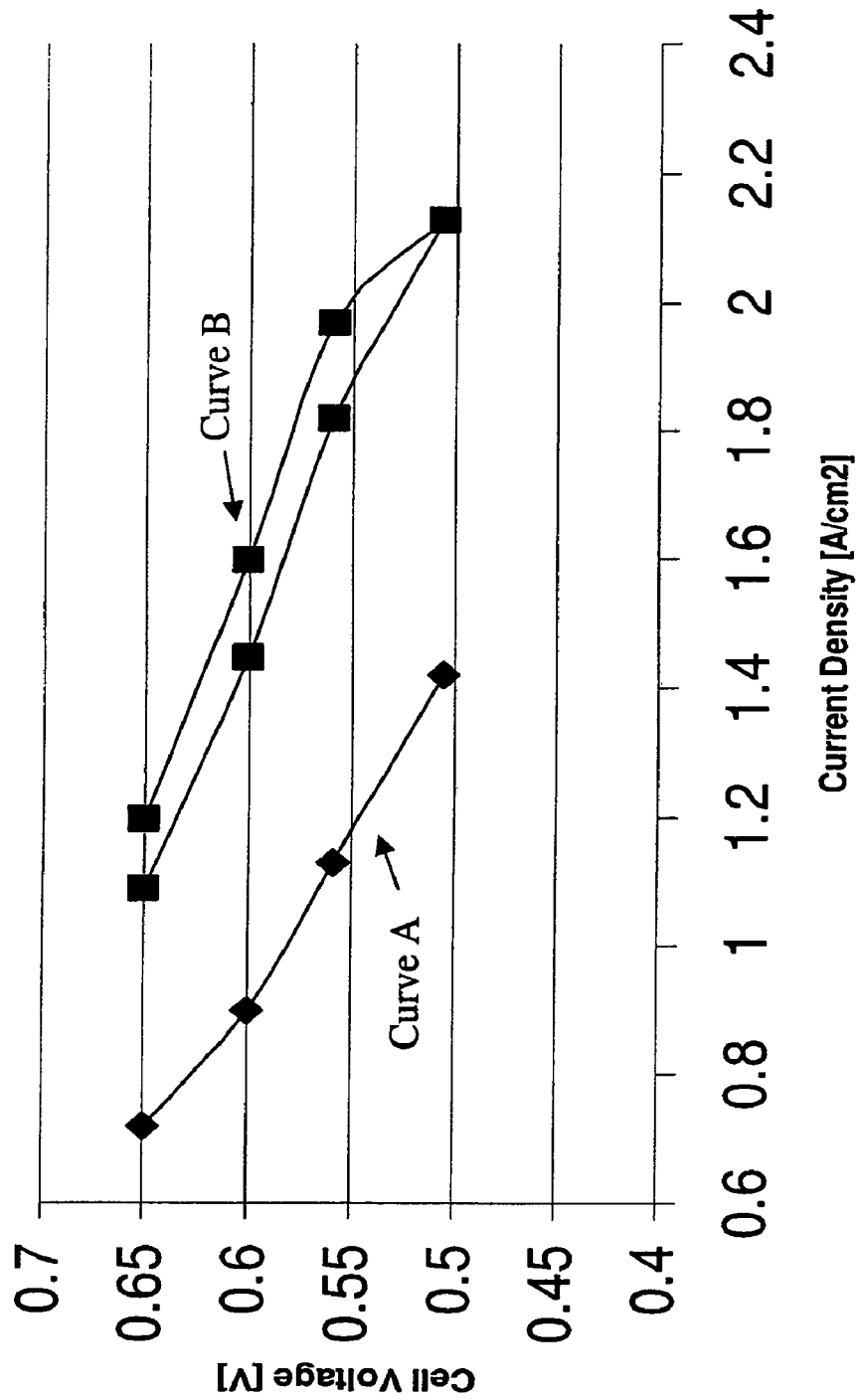
FIG. 7 is a graph of voltage vs. current density representing the polarization curves for a fuel cell in accordance with the principles of the present invention and one comparative fuel cell.

FIG. 7 is a graph of voltage vs. current density representing the polarization curves for a fuel cell according to the present invention (Curve B) and one comparative fuel cell (Curve A). The cells were tested under the same operating conditions and compression level in order to determine the impact of land width on cell performance. For the test, the pitch of the fine pitch plate was 1.6 mm (about 0.7 mm anode and cathode land areas, and 0.9 mm channels), and the pitch of the coarse pitch plate was 2.9 mm (1.5 mm anode and cathode land areas, and 1.4 mm channels).

The fuel cell polarization curves were obtained under the following test parameters: anode gas—hydrogen; cathode gas—air; electrode area—about 50 $cm^2$; cell compression—about 20%; cell temperature—about 80° C.; anode outlet gas pressure—about 0.1 Mpa (absolute); anode gas flow rate—about 2× stoichiometric; anode humidification equivalent to about 1× saturation at temperature; cathode outlet gas pressure—about 0.1 Mpa (absolute); cathode flow rate—about 2× stoichiometric; cathode humidification equivalent to about 1× saturation at temperature. The data demonstrated the superior performance of a fuel cell having the flow field plate arrangement according to the present invention over a fuel cell with a standard flow field of coarse pitch plates.

Providing a flow field plate pair such as described in the above embodiments achieves high power (lower cost per kW), improved durability, and less stringent assembly alignment. Referring back to FIG. 4, the narrow land areas 412 of the cathode flow field plate 200 improve gas access to the active area under the lands and allow higher current density operation. The narrow channels 204 and 304 of both the cathode and anode plates 200 and 300, respectively, improve thermal conduction from the active area within each channel to the adjacent land areas. By utilizing wider land areas 410 on the anode flow field plate 300 where gas diffusion is not limiting and orienting the anode land areas at an angle to the cathode land areas 412, the requirement for critical alignment of adjacent flow field plates 200 and 300 to provide land-on-land contact is alleviated.

Figure 8:
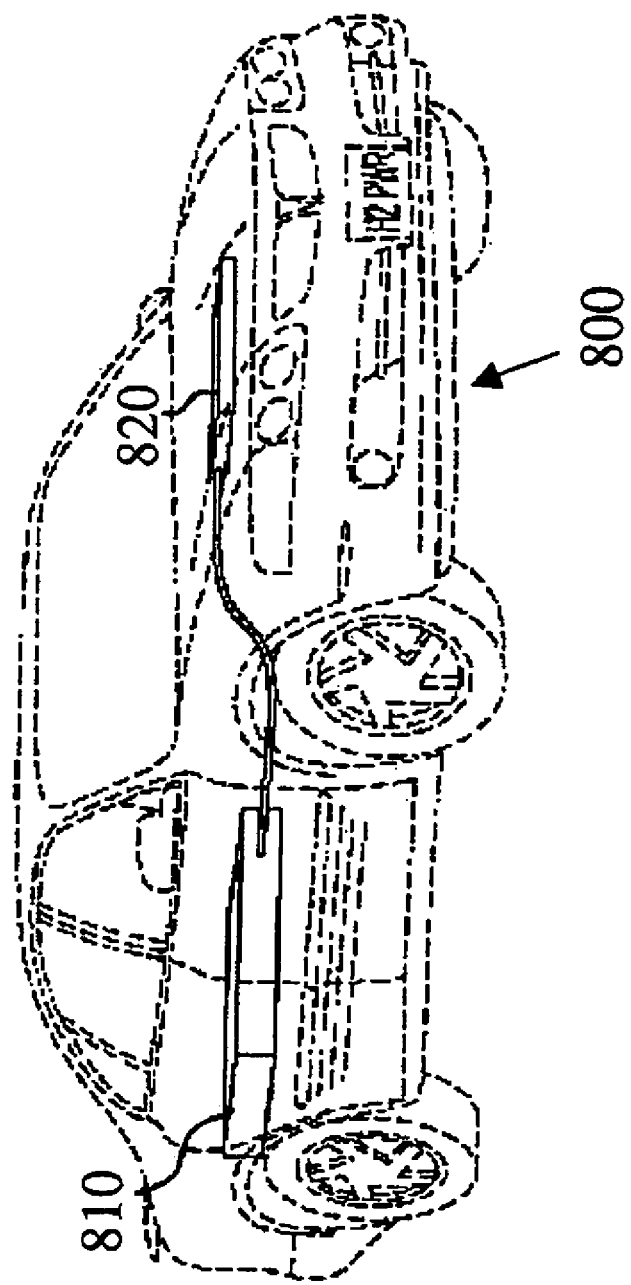
FIG. 8 is a plan view illustrating a fuel cell embodiment in accordance with the principles of the present invention configured to operate as source of power for a vehicle.

Referring now to FIG. 8 it is noted that a fuel cell according to the present invention may be configured to operate as a source of power for a vehicle 800. Specifically, a reformed gas product stream from a fuel storage unit 810 may be directed to a fuel cell assembly 820 configured to convert fuel, e.g., H2, into electricity. The electricity generated is subsequently used as a motive power supply for the vehicle 800 where the electricity is converted to torque and vehicular translational motion.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

We claim:

1. A pair of fluid flow plates for use with a generally planar polymer membrane electrolyte of a proton exchange membrane fuel cell stack, said plates comprising:
a first fluid flow plate comprising a plurality of oxidant channels separated by first lands, and
a second fluid flow plate comprising a plurality of fuel channels separated by second lands, wherein at least one of said second lands has a cross sectional width wider than a cross sectional width of at least one of said first lands, each of said oxidant channels and each of said fuel channels are formed with a multiple of alternating angles and wherein the multiple of alternating angles is different for said oxidant channels and said fuel channels, and are configured such that a respective oxidant or fuel flowpath formed by corresponding said channels and lands defines a pattern of overlapping, aligned crests between the first lands and the second lands, where said corresponding lands are arranged such that when said second fluid flow plate is placed in cooperation with said first fluid flow plate with a membrane electrode assembly that includes said generally planar polymer membrane electrolyte situated therebetween, said oxidant and fuel lands that are adjacent said membrane electrode assembly are arranged relative to one another to increase overlapping of their respective oxidant and fuel lands and wherein the crest alignment between the first lands and the second lands is achieved using at least one equation selected from the group consisting of $(Ac+Af)=N*p+/-Wc$ or $(Ac-Af)=+/-N*p+/-Wc$, wherein $Ac$ is the amplitude of said second lands, $Af$ is the amplitude of said first lands, $N$ is an integer, $p$ is a pitch, and $Wc$ is the land width of the second lands.

2. The pair of fluid flow plates according to claim 1 wherein said fluid plates are flow field plates for an electrochemical cell having anode and cathode sides, wherein said first fluid flow plate is for the cathode side, and said second fluid flow plate is for said anode side.

3. The pair of fluid flow plates according to claim 1 wherein a pitch of said second fluid flow plate is greater than a pitch of said first fluid flow plate.

4. The pair of fluid flow plates according to claim 1 wherein said first channels define a cross sectional width approximately equal to a cross sectional width defined by said second channels.

5. The pair of fluid flow plates according to claim 1 wherein at least one of said first and second lands are provided in a wiggle alignment pattern.

6. The pair of fluid flow plates according to claim 1 wherein said first and second lands each have a wiggle alignment pattern, and each said wiggle alignment pattern is in phase respectively.

7. The pair of fluid flow plates according to claim 1 wherein said first and second lands each have a wiggle alignment pattern and each said wiggle alignment pattern is out of phase respectively.

8. The pair of fluid flow plates according to claim 1 wherein said first and second lands are each provided in a wiggle alignment pattern, and a pitch of said second fluid flow plate is larger than a pitch of said first fluid flow plate.

9. The pair of fluid flow plates according to claim 1 wherein said first and second channels are predominately straight.

10. The pair of fluid flow plates according to claim 5 wherein said first and second channels are serpentine.

* * * * *